Figure 2:
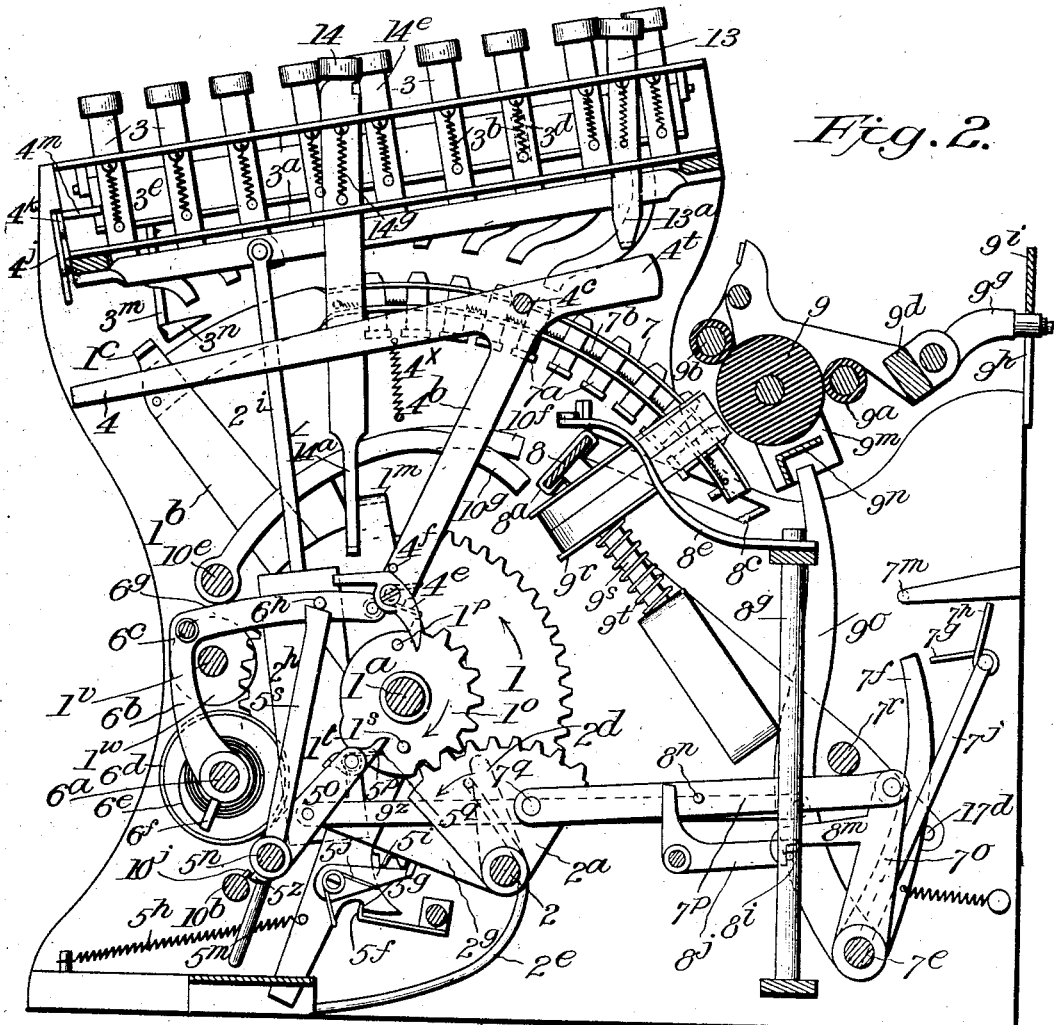

No. 824,510. PATENTED JUNE 26, 1906.
G. E. SCHUMAN.
CALCULATING MACHINE.
APPLICATION FILED AUG. 23, 1905.
6 SHEETS—SHEET 1.
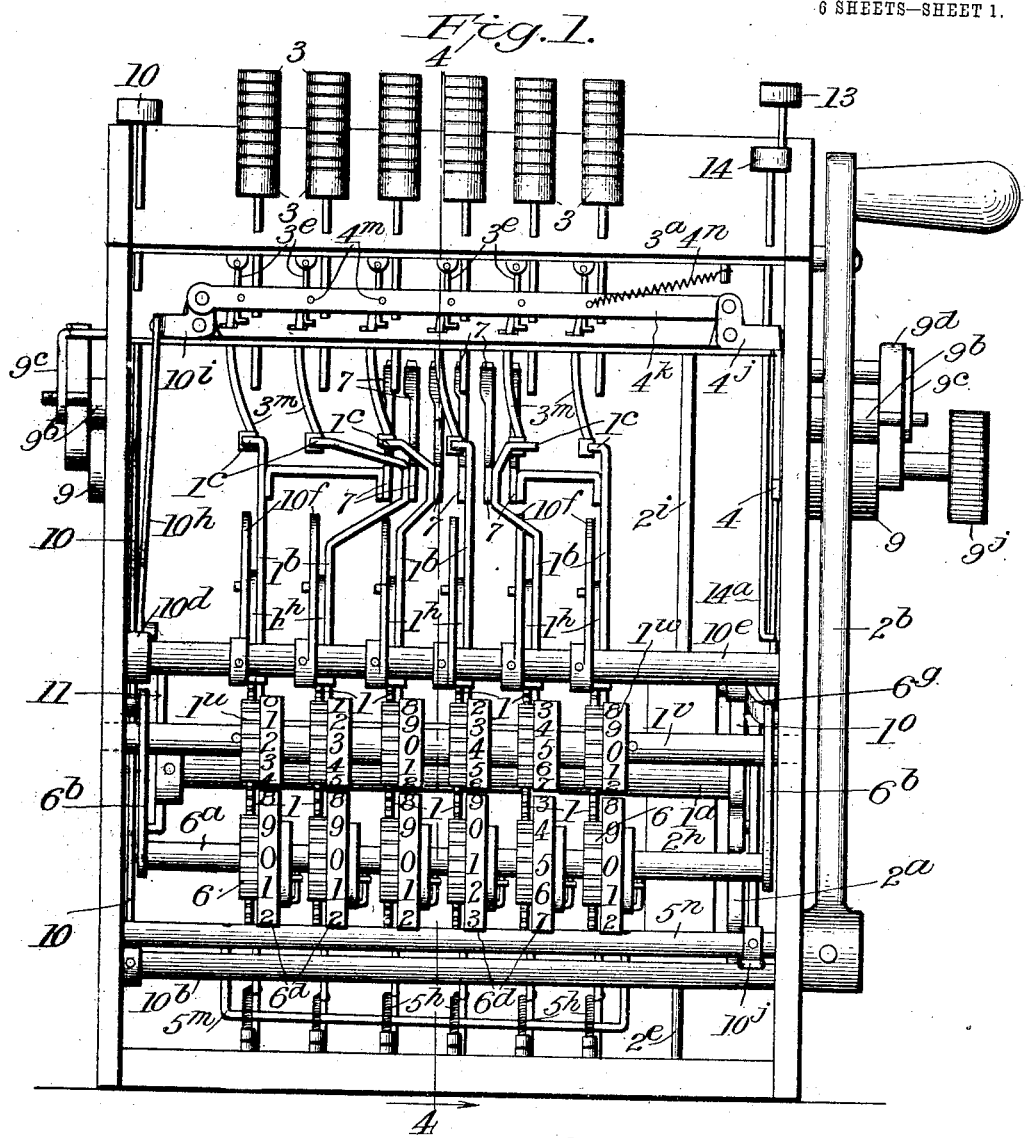
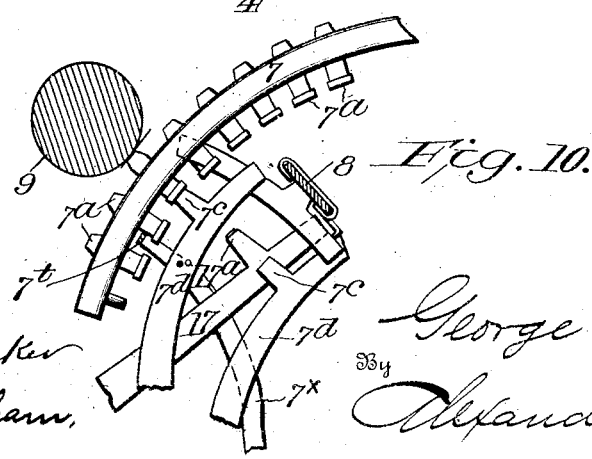
Witnesses
C. H. Walker
L. E. Witham
Inventor
George E. Schuman
By Alexander F. Powell
Attorneys Witnesses
C. H. Walker.
L. E. Witham.

Inventor
George E. Schuman
By Alexander Powell
Attorneys.

No. 824,510. PATENTED JUNE 26, 1906.
G. E. SCHUMAN.
CALCULATING MACHINE.
APPLICATION FILED AUG. 23, 1905.

6 SHEETS—SHEET 3.

Witnesses
C. H. Walker
L. E. Witham

Inventor
George E. Schuman
By
Alexander D. Powell
Attorneys

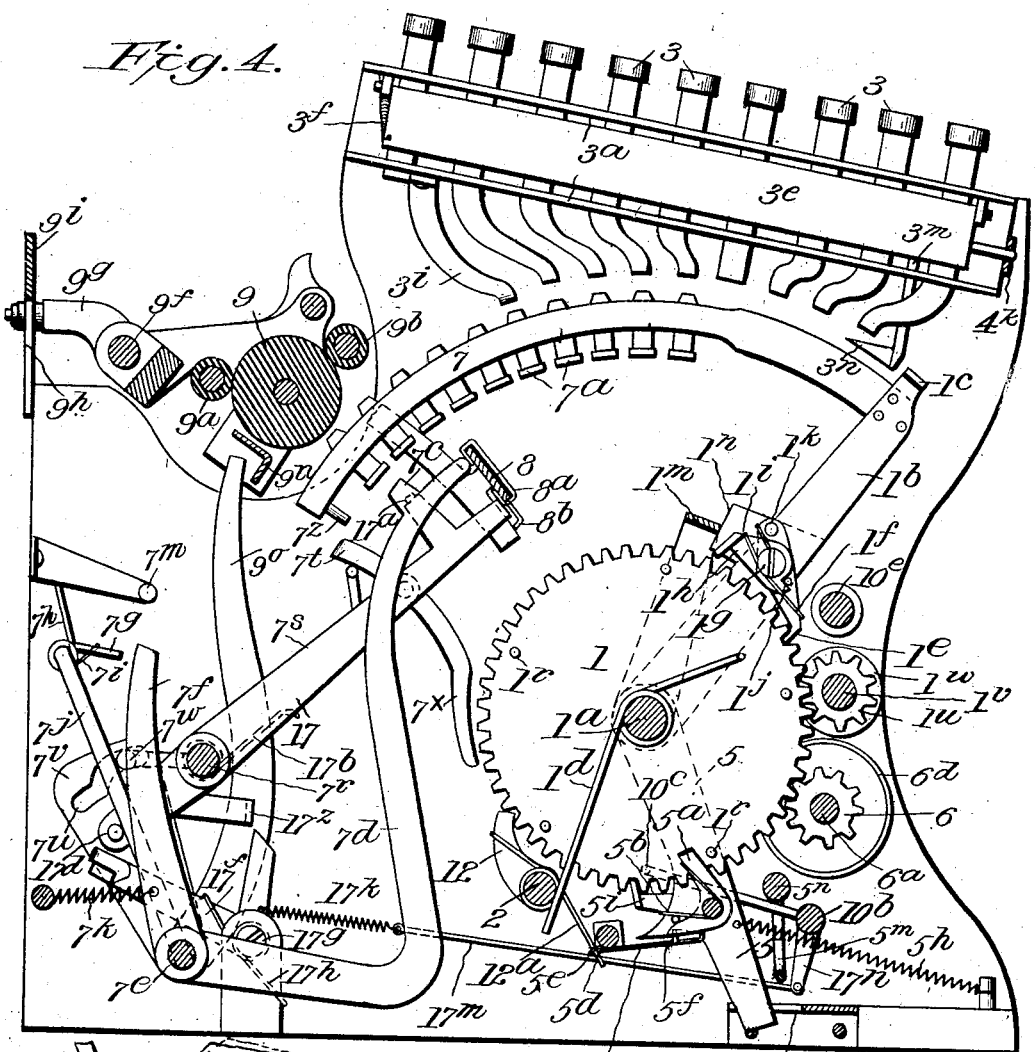

No. 824,510. PATENTED JUNE 26, 1906.
G. E. SCHUMAN.
CALCULATING MACHINE.
APPLICATION FILED AUG. 23, 1905.
6 SHEETS—SHEET 5.
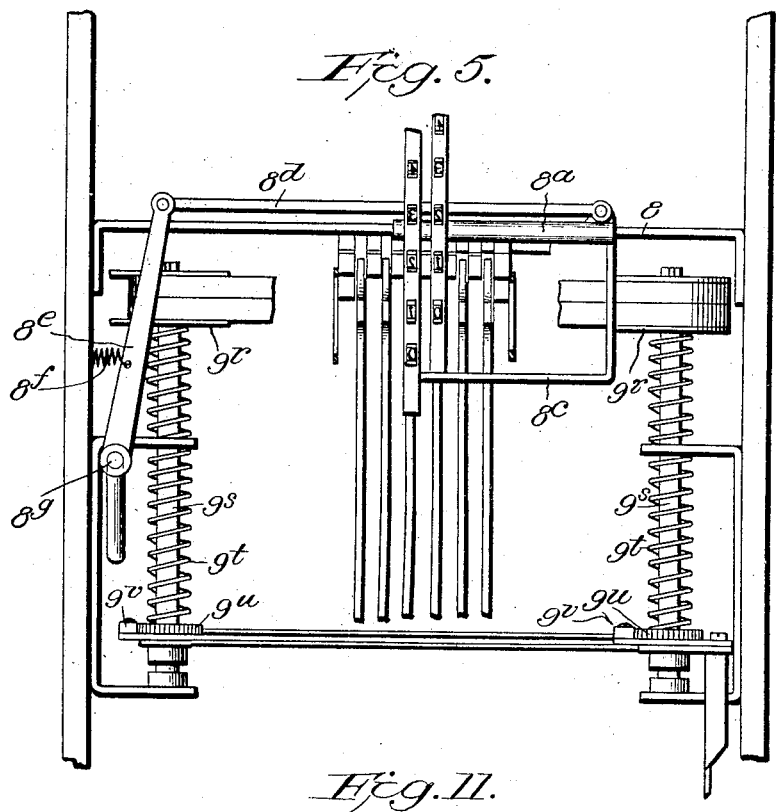
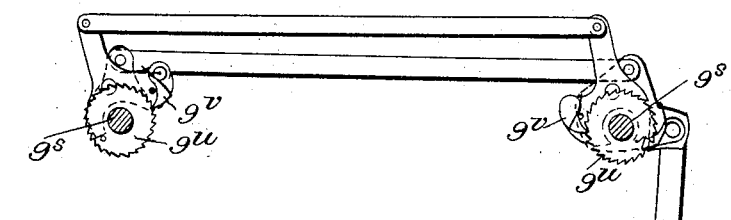
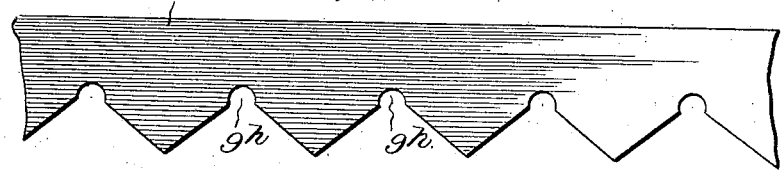

No. 824,510. PATENTED JUNE 26, 1906.
G. E. SCHUMAN.
CALCULATING MACHINE.
APPLICATION FILED AUG. 23, 1905.
6 SHEETS—SHEET 6.
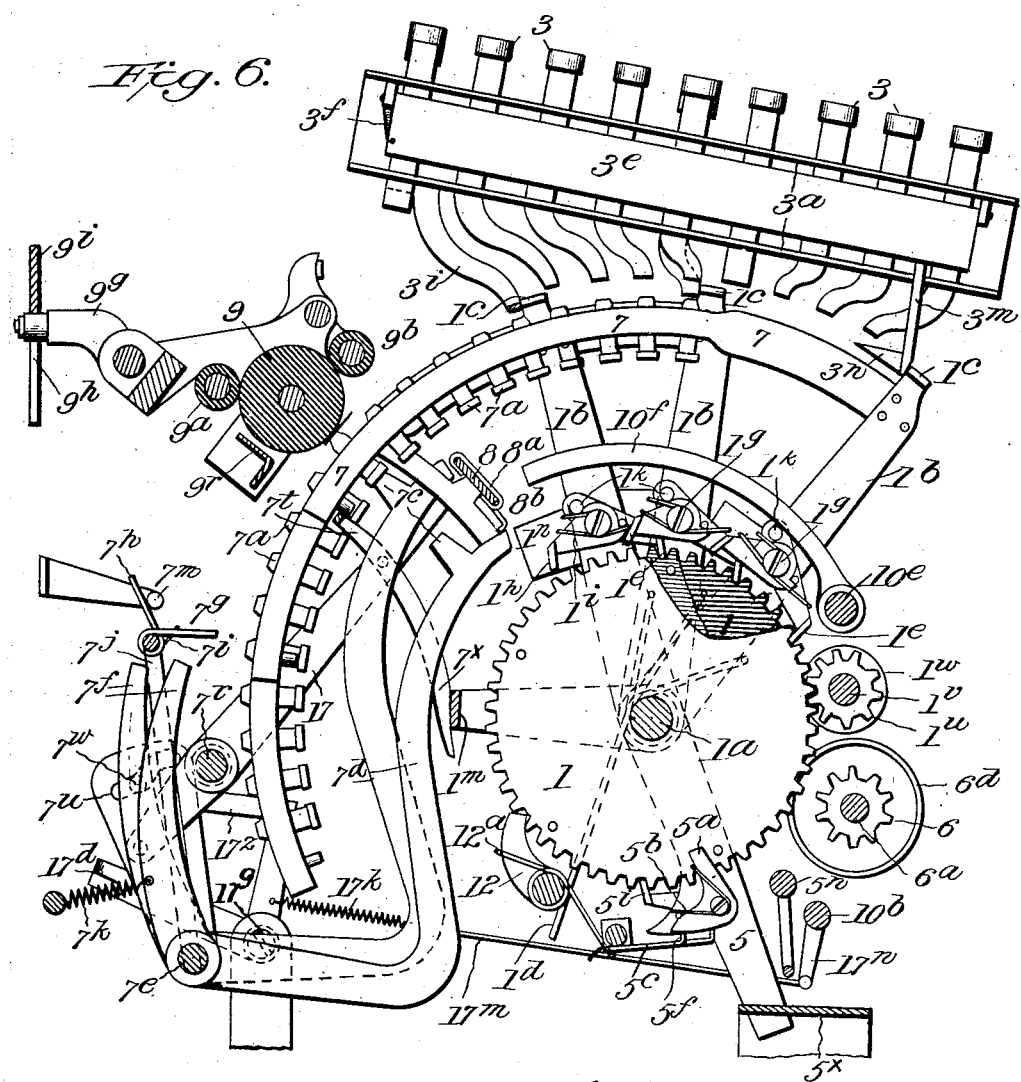
Fig. 6.
Fig. 13.
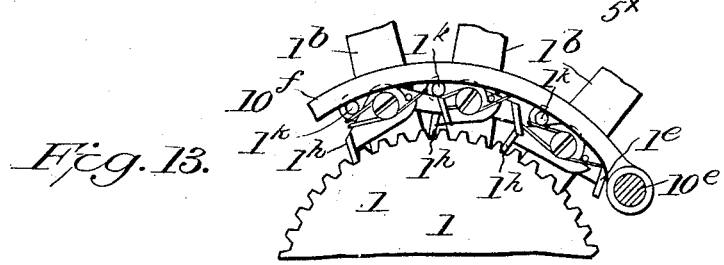
Witnesses
C. N. Walker
L. E. Witham
Inventor
George E. Schuman
By Alexander T. Sowell
Attorneys

UNITED STATES PATENT OFFICE.

GEORGE E. SCHUMAN, OF LOUISVILLE, KENTUCKY.

CALCULATING-MACHINE.

No. 824,510.  Specification of Letters Patent.  Patented June 26, 1906.

Application filed August 23, 1905. Serial No. 275,373.

*To all whom it may concern:*

Be it known that I, GEORGE E. SCHUMAN, of Louisville, in the county of Jefferson and State of Kentucky, have invented certain new and useful Improvements in Calculating-Machines; and I hereby declare that the following is a full, clear, and exact description thereof, reference being had to the accompanying drawings, which form part of this specification.

This invention is an improvement in calculating-machines; and its objects are to provide a machine capable of performing operations in addition with accuracy and rapidity, to provide improved registering mechanism, to provide novel key mechanism, to provide novel mechanism for arresting or detaining the registering-levers when no keys pertaining thereto are depressed, to provide novel carry-over mechanism, to provide a novel total-indicating mechanism, to provide a novel mechanism for indicating the last item recorded until the next is being recorded, so that the operator can always see upon returning to the machine what was the last item recorded without having to inspect the printed record, to provide novel printing mechanism for recording the items and totals, to provide a novel type-hammer-locking mechanism, to provide a novel type-alining mechanism, to provide a novel totaling mechanism whereby the totals may be ascertained and printed at any time, to provide a novel mechanism for indicating on the record whenever a total has been taken or the machine reset to "zero," to provide novel paper-carriers, to provide novel repeating mechanism whereby items may be repeated without resetting the keys, and to provide a novel error-key whereby the keys may be released without operating the machine in case an error has been made in depressing the keys.

The invention will be clearly understood from the following description, and the features and combinations of parts embodying the invention for which protection is desired are summarized in the claims following the description of the machine as illustrated in the accompanying drawings, in which—

Figures 7, 8:
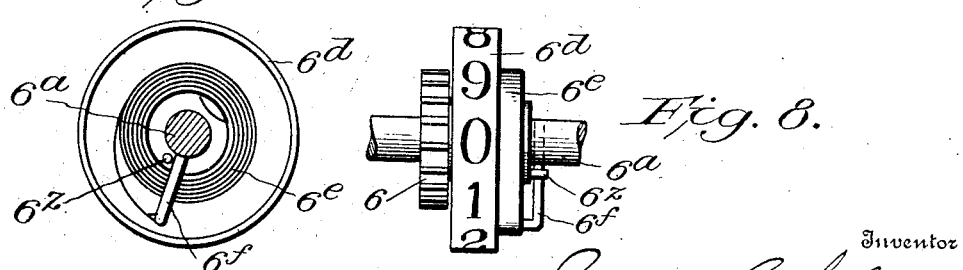
Figure 3:
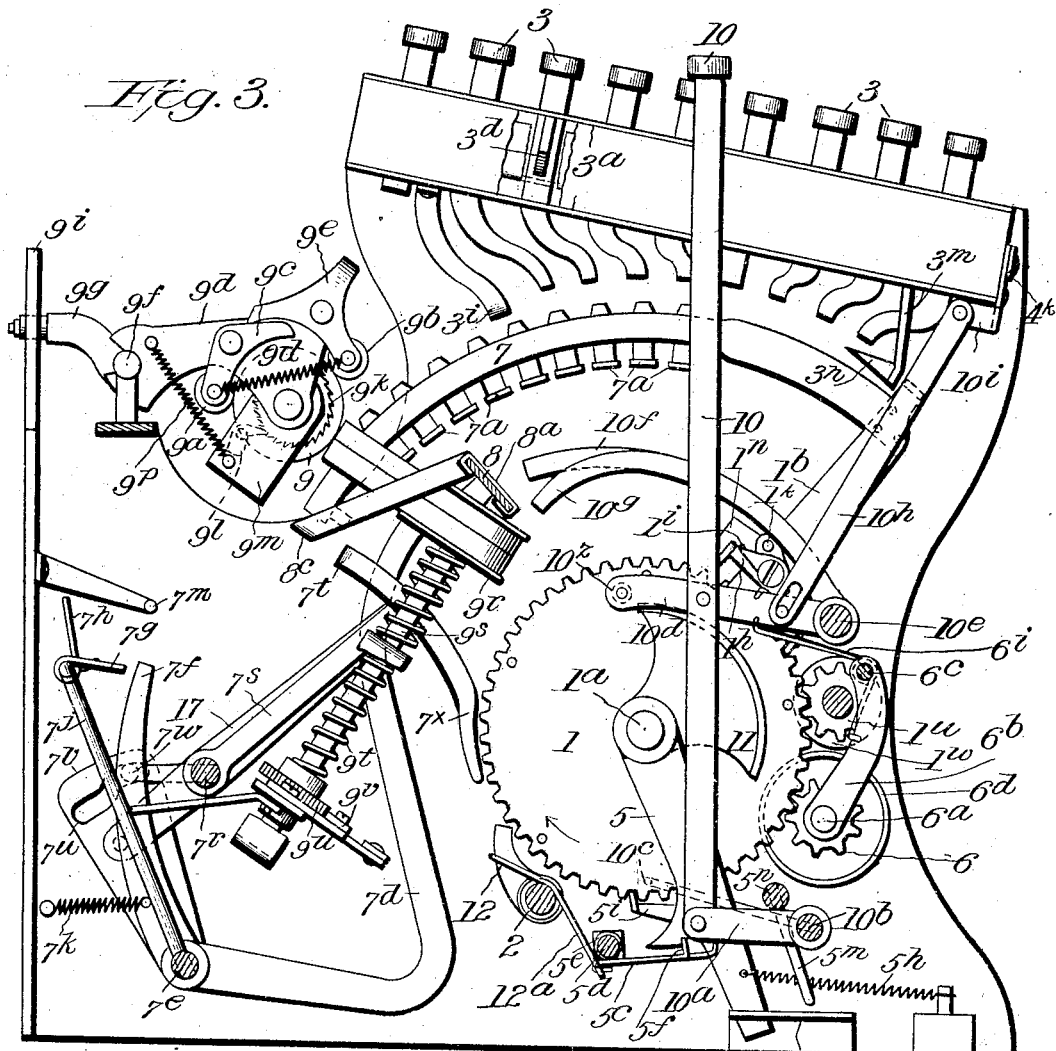
Figure 9:
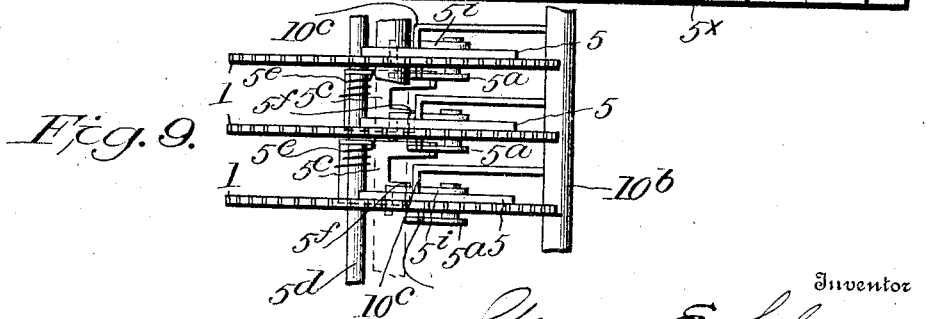

Figure 1 is a front elevation of the machine with the outer casing broken away or removed, so as to show the operative parts. Fig. 2 is a right-hand elevation of the machine with the side of casing removed. Fig. 3 is a left-hand elevation of the mechanism with the left-hand side of casing removed. Fig. 4 is a vertical section on line 4 4, Fig. 1. Fig. 4$^a$ is a detail view of the "total-indicator recording mechanism." Fig. 5 is a detail view of the printing mechanism. Fig. 6 is a detail sectional elevation showing the parts in the positions assumed when the hand-lever is thrown forward. Figs. 7 and 8 are detail side and front views of one of the "item-indicating" disks detached. Fig. 9 is a detail plan view of the "carry-over" devices in Fig. 3. Fig. 10 is a detail view of the printing mechanism indicating a hammer printing. Fig. 11 is a detail view of the ribbon-actuating devices. Fig. 12 is a detail view of the paper-carriage-adjusting plate. Fig. 13 is a detail view showing the registering-wheel pawls thrown into totaling position.

The machine embodies a plurality of adding mechanisms arranged side by side and each constructed substantially alike and arranged, as usual, so that the "units-wheel" carries over at the "tenth" unit to the "tens-wheel" and so on up to the total capacity of the machine. There is one set of such mechanisms for each denomination in the decimal notation up to the capacity of the machine, which can be made of any desired capacity by simply adding additional duplicate mechanisms.

*The registering mechanism.*—The registering-wheels 1 are loosely mounted side by side on a shaft $1^a$, journaled in the sides of the main frame of the machine. Each registering-wheel is constructed with a multiple of ten teeth—as shown, each has fifty teeth—so that for each fifth of a revolution of the wheel ten numerals of its denomination will be counted and at every fifth of a revolution of a registering-wheel of lower denomination mechanism is actuated to carry over or move the wheel of next higher denomination one tooth.

Loosely mounted on the shaft $1^a$ beside each registering-wheel 1 is a vibrating lever $1^b$, which is thus pivoted beside the wheel and swings in an arc concentric therewith. The levers are thrown backward by springs $1^d$ when the levers are released from control of the resetting-arm, hereinafter described. The springs $1^d$ are conveniently mounted on shaft $1^a$, as shown. The upper end of each lever $1^b$ is provided with a laterally-projecting finger $1^e$, which moves in an arc when the lever is oscillated parallel with and beneath a related row of keys 3, and if any key in such row be depressed it will arrest the backward movement of such lever.

Each lever $1^b$ carries a pawl $1^e$, which is normally held in engagement with the teeth of the registering-wheel by a spring $1^f$, the pawl being pivoted on a pin or screw $1^g$, attached to the lever. Pivoted on said pin $1^g$ is a second pawl $1^h$, which extends in a direction opposite pawl $1^e$, and its tail engages a pin $1^j$ on pawl $1^e$, so that when one pawl is in engagement with the wheel 1 the other is out of engagement. Pawl $1^h$ is controlled by a spring $1^i$, hung on a screw $1^g$, with one end bearing on pawl $1^h$ and the other on pin $1^k$, so that the spring $1^i$ does not oppose the spring $1^f$, which normally holds pawl $1^e$ in engagement with the wheel 1.

The tail of pawl $1^e$ projects beyond and above pawl $1^h$ and is provided with a pin $1^k$, which at the proper times is engaged and depressed by suitable devices, hereinafter explained, to throw pawl $1^h$ into engagement with the wheel 1.

The levers $1^b$ are normally held in forward position against the action of springs $1^d$ by means of a pusher $1^m$, attached to shaft $1^a$, said pusher, as shown, being in the form of a bail-shaped bar. The pusher $1^m$ is adapted to engage projections $1^n$ on levers $1^b$, as shown, so as not to interfere with the pawls. The shaft $1^a$ is controlled by suitable springs, so as to normally throw the pusher forward.

As shown in Fig. 2, a segmental gear $1^o$, keyed on shaft $1^a$, meshes with a segmental gear $2^a$ on a shaft 2, journaled in the main frame parallel with shaft $1^a$. Shaft 2 is provided with a hand-lever $2^b$ on its outer end, by which it can be rocked forwardly; but when the lever is released the shaft is rocked backward and normally held in rearmost position by means of a stout spring $2^e$, attached to an arm $2^d$ on shaft 2 and to a suitable point on the main frame, as shown in Fig. 2. As shaft $1^a$ is geared to shaft 2, it is obvious that the normal position of shaft $1^a$ is that shown in Fig. 2, with the pusher $1^m$ holding all the levers $1^b$ in their foremost position.

If desired, the return spring-impelled movement of shafts 2 and $1^a$ may be cushioned by a dash-pot $2^h$, attached to an arm $2^g$ on shaft 2 and engaged by a plunger attached to a rod $2^i$, pivotally connected to the frame, as shown in Fig. 2.

*The keyboard.*—As shown, there are nine keys in each row, (one row for each denomination.) These keys 3 are vertically movable, and their stems are mounted in slotted plates $3^a$, attached to the frame, as shown. The lower ends of the first eight key-stems are curved so that their extremities will coincide with the arc traversed by the finger $1^c$ on the related lever $1^b$ and will be equidistant, so that the space traversed by the lever $1^b$ in moving from one key to the next will just suffice to move the registering-wheel 1 one notch or tooth. Each key is normally upheld by means of a suitable spring $3^b$, attached to the key and to a suitable point on the upper plate $3^a$, as shown in Fig. 2. Each key-stem has a ratchet-tooth $3^d$ on its side, which when the key is depressed catches under a swinging catch-plate $3^e$, hung from the upper slotted plate $3^a$ and normally swung inward toward the stems by a spring $3^f$, so as to lock any depressed key until after the registration has been effected, when it is automatically disengaged from the key, as hereinafter described. This plate $3^e$, moreover, prevents more than one key being locked down successively in any one row, and only the last key depressed will remain down, for if the wrong key is depressed and locked the operator merely has to push down the right key, which as it descends swings the locking-plate $3^e$ outward, releasing the previously-depressed key, while the last-depressed key is held down. Thus if the operator discovers an error in his keyboard before actuating the hand-lever $2^b$ he can instantly correct it by merely depressing the proper keys without having any errors in computation arise.

Preferably the stem of the ninth key is short, and when "9" is to be added on any one wheel the lever $1^b$ meets no obstruction in its rearward movement until it strikes a stop-bar $3^i$, which is permanently fastened at the rearmost limit of movement of the levers $1^b$ and serves as a common "ninth" stop for all the levers $1^b$.

*The registering-lever detainer.*—In order to prevent the lever $1^b$ moving rearward when no keys have been depressed in its related row, although it is released by the rearward movement of the pusher $1^m$, I provide a retainer-finger $3^m$, which is attached to the forward end of the related catch-plate $3^e$ and depends just in front of the lever $1^b$ when the latter is in foremost position, Fig. 2. When any key in such row is depressed, however, the catch-plate $3^e$ is swung outward, so as to move the detainer $3^m$ out of the path of finger $1^c$ of the lever $1^b$, and as the catch-plate cannot swing back to inactive position until all the keys are released the detainer remains out of the way until the lever $1^b$ has made its operative oscillation. The detainer $3^m$ is provided with a slanting guard $3^n$, which the lever $1^b$ will engage on its return movement (if the detainer has swung back to operative position) and push the detainer out of the way, so it will not be injured.

*The key-release.*—After each registering operation it is necessary to release the keys prior to setting the next item, and this is done as follows, (see Fig. 2:) Arranged at the front of the keyboard and extending past the forward ends of the several catch-plates $3^e$ is a slide-bar $4^k$, which is suitably supported, so that it can be reciprocated longitudinally. This bar has a series of inwardly-projecting pins $4^m$, which project near the adjacent ends of the catch-plates $3^e$, but lie normally out of contact therewith. Bar $4^k$ (see Fig. 1) is pivotally connected to one arm of a bell-crank lever $4^j$, pivoted on the frame with its free arm lying below the keyboard in position to be struck by the free end of a vibrating lever 4, pivoted at $4^c$ to the side of the frame. Lever 4 has a depending arm $4^b$, which extends downward toward a segmental gear $1^o$ on shaft $1^a$. On the lower end of arm $4^b$ is pivoted a dog $4^e$, which has a tooth depending beside segment $1^o$ and adapted to be engaged by a pin $1^p$ thereon. When segment $1^o$ rotates backwardly, pin $1^p$ tilts the dog and passes thereunder without oscillating lever 4; but on the return movement of the segment pin $1^p$ engages the dog, and the latter being locked against a stop $4^r$ on arm $4^b$ said arm is swung forward, raising lever 4 and causing its upper end to strike lever $4^j$ and cause it to move bar $4^k$, so that pins $4^m$ thereon engage the catch-plates $3^e$ and swing them outward or away from the key-stems, thus releasing all the keys. The pin $1^p$ moves forward sufficiently to clear dog $4^e$, whereupon arm $4^b$ and lever 4 are returned to normal position by a spring $4^b$, and bar $4^k$ is also returned to normal position by a spring $4^n$.

*The carry-over.*—A laterally-projecting pin $1^r$ is attached to the side of each wheel 1 adjacent each tenth tooth. (In the drawings there are five such pins on each registering-wheel.) This pin is adapted to engage one arm of a bell-crank trip $5^a$, pivoted on a swinging lever 5, hung on shaft $1^a$ beside the registering-wheel and having its lower end guided in a slotted plate $5^x$, the trip being controlled by a spring $5^b$. The lower arm of trip $5^a$ lies above a plate $5^c$, loosely mounted on a transverse rod $5^d$, said plate being upheld by a spring $5^e$, and a tooth $5^f$ on plate $5^c$ engages a notch $5^g$ on a projection of the next adjacent lever 5 pertaining to the wheel of next higher denomination and locks this lever in rearmost position, as indicated in Figs. 2, 3, 4, against the tension of a spring $5^h$, which always tends to swing lever 5 forward. The lever 5 adjacent each wheel of higher denomination carries a pivoted dog $5^i$, which is yieldingly held in engagement with the teeth of such registering-wheel by a spring $5^j$. This dog will trail on the wheel when the lever 5 is swung outward, but will move the wheel when the lever is swung inward. Any released lever 5 will be moved backward at the proper time by means of a bail $5^m$ attached to a rock-shaft $5^n$, which is provided with an arm $5^o$, carrying a dog $5^p$, controlled by a spring $5^q$ (see Fig. 2) said dog projecting into the path of a pin $1^s$ on segment $1^o$, so that when said segment is rocked by the forward movement of hand-lever $2^b$ the pin $1^s$ will engage the dog and rock-shaft $5^n$, so as to cause the bail $5^m$ to push the lever 5 rearward until they are locked by the engaging plates $5^c$, and on the return movement of the segment the dog will yield and allow the pin $1^s$ to pass it without affecting the shaft $5^n$.

Now when a pin $1^r$ on a wheel 1 of lower denomination engages and actuates the related trip $5^a$ said trip depresses the adjacent catch-plate $5^c$ and causes it to release the lever 5 of the wheel of next higher denomination, whereupon the said lever is thrown forward by its spring $5^h$. Then when the hand-lever $2^b$ is drawn forward shaft $5^n$ is rocked, as described, and bail $5^m$ pushes the released lever 5 inward sufficiently to cause its dog $5^i$ to turn its registering-wheel one tooth, and thus effects the carry-over operation. If the wheel of higher denomination just referred to happened to stand at the ninth tooth at the time its lever 5 was released by the movement of the wheel of lower denomination, obviously a pin $1^r$ on such wheel would in such case be in the path of the trip $5^a$ on its related lever 5, so that when said lever was swung backward by spring $5^h$ the trip $5^a$ thereon would be rocked by the pin $1^r$ on the stationary wheel and cause the next catch-plate to release the lever 5 of the next wheel of higher denomination, so that when shaft $5^n$ was rocked both wheels of higher denomination would be actuated and the carry-overs effected.

*The total-indicator.*—Each registering-wheel 1 meshes with a small ten-toothed pinion $1^u$, loosely mounted on a shaft $1^v$ in front of the registering-wheels, and each pinion $1^u$ has a numeral-disk $1^w$, so that by reading the alined numbers on said disk $1^w$ at the sight-opening the total amount added by the registering-wheels can be ascertained.

*The item-indicator.*—Opposite each registering-wheel 1 is a pinion 6, loosely mounted on a laterally-movable rod $6^a$, which is supported on swinging hangers $6^b$, pivoted to the sides of the frame, as at $6^c$. Each pinion 6 is provided with a numeral-disk $6^d$, and said disks and pinions are normally held at zero position by means of a coiled spring $6^e$, one end of which is attached to the disk and the other to an arm $6^f$ on rod $6^a$, which arm $6^f$ also serves as a stop to engage a pin $6^z$ on the disk to arrest the return movement of the disk at zero position. Rod $6^a$ is moved in position to bring pinions 6 in mesh with the registering-wheels 1 by means of an arm $6^g$, attached to one of the hangers $6^b$ and extending inward toward the segment $1^o$, which segment has a cam portion $1^t$, (see Fig. 2,) which engages the inner end of arm $6^g$ when the segment is rocked by the forward movement of hand-lever $2^b$ and raises said arm, thereby swinging rod $6^a$ inward and causing pinions 6 to mesh with wheels 1 before the latter are rotated. After the cam $1^t$ has raised arm $6^g$ the latter is upheld (during the return movement of hand-lever $2^b$ and segment $1^c$) by means of a finger $5^s$ on shaft $5^n$, which drops under a pin $6^h$ on arm $6^g$ (see Fig. 2) and remains there until shaft $5^n$ is rocked by the next succeeding forward movement of the hand-lever $2^b$. The pinion 6 comes into mesh with wheels 1 when the pinions are at zero position and remain in mesh therewith while and after the wheels are moved to register. Consequently the number of teeth each wheel has moved will be shown by its related indicator-disk $6^d$ and by reading the alined numbers on such disks at the sight-opening or reading-point the amount of the last item just taken by the machine will be ascertained. This "item" remains visible until the operator has set the keys for the next item and moves hand-lever $2^b$ forward to register it, whereupon the initial movement of shaft $5^n$ draws finger $5^g$ away from pin $6^n$ and permits arm $6^h$ to drop, and rod $6^a$ swings forward, taking the pinions 6 out of mesh with the registering-wheels, this movement of rod $6^a$ being accelerated by a spring $6^i$, and as soon as pinions 6 are out of mesh with wheels 1 springs $6^e$ throw disks $6^d$ back to zero position. Immediately thereafter and during the continuance of the forward movement of hand-lever $2^b$ cam $1^t$ again engages arm $6^g$ and returns the pinions 6 into mesh with the wheels 1 before they are actuated, and they remain in mesh therewith until the next initial forward movement of hand-lever $2^b$, as above described. Thus the operator can leave the machine at any time and always can see at a glance what was the last item recorded if he looks before again manipulating hand-lever $2^b$.

*The printing mechanism.*—The machine is provided with mechanism to print each item added on the machine as follows: Attached to the levers $1^b$ are curved type-carrying bars 7, each of which carries ten type characters, (numerals "0" to "9," inclusive.) Each type character $7^a$ is radially movable in the bar and is held in position by a spring $7^b$, which may be threaded through the several type, as shown, and permits each type to be projected outward at the printing-point when struck by a hammer $7^c$, as hereinafter explained. The type-carriers 7 are arranged close together, so that impressions from the type thereon will be properly related. Each type-hammer $7^c$ is mounted on a lever $7^d$, Figs. 3 and 4, which is loosely pivoted on a shaft $7^e$, and is provided with an arm $7^f$, by which the hammer is "cocked," a spring $7^k$, connected to said arm and a point on the frame, being adapted to actuate the hammer. The arms $7^f$ are engaged and moved inward to "set" the hammers by a push-plate $7^g$, mounted on a bail $7^j$, attached to shaft $7^e$, plate $7^g$ lying behind arms $7^f$ and being normally held by a spring $7^i$ at such an angle that when bail $7^j$ is swung inward plate $7^g$ will engage arms $7^f$ and push them inward, setting the hammers against the resistance of springs $7^k$. After the type are in position of print plate $7^g$, which continues to move inward, is tripped by means of a finger $7^h$ engaging a stop $7^m$, Figs. 3 and 4, and caused to release arms $7^f$, whereupon springs $7^k$ throw the hammers against the type, and the latter are forced outward and make an impression on the paper carried by the paper-carriage, hereinafter described. The shaft $7^e$ is rocked at the proper time, so as to move plate $7^g$, as described, by means of a crank-arm $7^o$, connected by a link $7^p$ with a pin $7^q$ on segment $2^a$. (See Fig. 2.)

*The type-alining device.*—Above shaft $7^e$ is a shaft $7^r$, on which are arms $7^s$, that extend toward the hammers $7^c$, but terminate below the tops thereof. To these arms $7^s$ is pivoted a bail-shaped bar $7^t$, which is adapted to come underneath a row of alined types, preferably in a row beneath those at the printing-point, and is then rocked so as to engage such types and bring them into exact alinement, so that the printed record will appear perfect. The bail $7^t$ is moved rearward after the type-carriers have come to rest ready for the printing operation by means of a cam-slot $7^u$ in a plate $7^v$, attached to shaft $7^e$ and actuated thereby, said slot $7^u$ being engaged by a pin $7^w$, attached to shaft $7^r$, so as to impart a proper rocking motion to shaft $7^r$ at the proper time and then hold said shaft momentarily at rest, a suitable dwell being provided in slot $7^u$ for this purpose. While bail $7^t$ is thus held in its rearmost position a forwardly-extending finger $7^x$, on the bail is engaged by the pusher $1^m$, which at the moment is moving to its rearmost position, and bail $7^t$ is elevated slightly so as to engage the type, as described, and hold them momentarily in alinement while the hammers strike them. Then as pusher $1^m$ moves back the bail is released, and the bail drops back out of the way as the shaft $7^e$ returns to normal position. In order to aline the "0" type on such carriers as have not been moved, I provide a pin $7^z$ on the inner end of each carrier, (see Fig. 4,) which will be engaged by bail $7^t$ during the alining operation, if such carrier has not been displaced.

*The type-hammer lock.*—In order to prevent the hammers printing ciphers to the left in cases where wheels of higher denomination have not been moved, I provide devices for locking such hammers when cocked, as follows: On a bar 8, in front of and slightly above the hammers, is a slide $8^a$, which is provided with a depending part $8^b$, that is adapted to pass in rear of the upper ends of the hammers after they are cocked and will prevent the hammers springing back when released by plate $7^g$. As only the left-hand hammers should be locked, the inward movement of slide 8ª is automatically controlled by the type-carriers, said plate being provided with a bayonet-shaped finger 8ᶜ, which projects in rear of the hammers (see Fig. 5) and is adapted to contact with the type-carrier of the wheel of highest denomination that has been shifted and arrest the slide, so that it only locks the hammers to the left of such carrier. Consequently when plate 7ᵍ disengages the arms 7ᶠ the hammers locked by slide 8ª will not actuate the type, while the other hammers will operate as above described. Then after bail 7ᵗ has returned to its normal position, Fig. 4, the slide 8ª is moved back out of the way, so as not to interfere with the next setting operation of the hammers, and the released hammers fly back, but are arrested by bail 7ᵗ before they can engage the type. Slide 8ª is moved inward at the proper time by means of a link 8ᵈ, connected to an arm 8ᵉ on a vertical rock-shaft 8ᵍ, a spring 8ᶠ drawing the slide inward (when permitted) until it is arrested by finger 8ᶜ striking type-carrier, as above explained. The slide is positively moved out of the way at the proper time and held out of the way until the plate 7ᵍ cocks the hammers by means of a pin 8ⁱ on shaft 8ᵍ, which is engaged by a catch 8ᵐ on arm 7ᵒ, attached to shaft 7ᵉ, so that when shaft 7ᵉ is rocked backward slide 8ª is moved to the left clear of the hammers. Shaft 7ᵉ returns before slide 8ª should be released. Consequently a bell-crank-shaped detent 8ʲ is pivoted beside shaft 8ᵍ in position to drop in front of pin 8ⁱ and lock the latter in the position to which it has been drawn by catch 8ᵐ (see Fig. 2) and hold it while shaft 7ᵉ and catch 8ᵐ rock forward and until a pin 8ⁿ on link 7ᵖ strikes the upstanding arm of the detent and causes it to disengage pin 8ⁱ, whereupon spring 8ᶠ throws the slide into locking position until it is arrested by finger 8ᶜ striking a type-carrier, as indicated in Fig. 5.

*The totaling mechanism.*—In order to print the total amount which has been added at any time, I provide the following devices. (See Fig. 3.) A key-stem 10 is arranged at one side of the machine and is pivotally connected at its lower end to an arm 10ª on a shaft 10ᵇ, which shaft has a series of fingers 10ᶜ extending inwardly and normally overlying the pawls 5ⁱ, (see Fig. 4,) so that when the key is depressed said fingers will disengage said pawls 1ᵉ from the wheels 1. The stem 10 is also pivotally connected to an arm 10ᵈ on a shaft 10ᵉ, Fig. 3, to which is attached a series of curved arms 10ᵇ, which extend over the pawls 1ᵉ and are adapted (when stem 10 is depressed) to engage pins 1ᵏ on the tails of pawls 1ᵉ and throw said pawls out of engagement with wheels 1 and at same time cause pawls 1ʰ to engage with said wheels, the arms 10ᶠ being long enough to hold the pawls in this condition during the entire movement of levers 1ᵇ, the pawls 1ᵉ trailing under the curved arms. Arm 10ᵈ is connected by a link 10ʰ with a bell-crank 10ⁱ, pivotally connected to the bar 4ᵏ, so that when arm 10ᵈ is depressed said bar 4ᵏ is shifted so as to swing the catch-plates 3ᵉ and move detents 3ᵐ out of the way of levers 1ᵇ and hold them so as long as key 10 is depressed. On shaft 10ᵇ is a pin 10ʲ, Fig. 2, which is adapted to engage a lug 5ᶻ on shaft 5ⁿ and rock said shaft, so as to disengage finger 5ˢ from pin 6ʰ and allow rod 6ª to swing pinions 6 out of mesh with the wheels 1, as above described. All these operations being performed on the depression of stem 10, the operator then draws hand-lever 2ᵇ forward, freeing levers 1ᵇ from pusher 1ᵐ, whereupon the said levers 1ᵇ are thrown backward by their individual springs, and as pawls 1ʰ are then in mesh with wheels 1 said wheels will be rotated backward until their pins 1ⁿ come against the rear side of the trip 5ª, Fig. 4, whereby the wheels are arrested with the small wheels at "0," and the proper type will then be arrested at the printing-point, and the total is printed immediately thereafter before the hand-lever completes its forward stroke. If the stem 10 be held down while the hand-lever 2ᵇ is making its return stroke, the numeral-disks 1ʷ will remain reset to zero; but if the stem 10 be released before the hand-lever is returned pawls 1ᵉ will engage the wheels 1, and the wheels 1 and the numeral-disks will assume the same positions they had before the total-key was depressed.

The totals and subtotals may be printed in a distinguishing-ink, as hereinafter explained.

In order to prevent the total-key being depressed accidentally or to prevent said key from springing up to normal position, except when hand-lever 2ᵇ is in extreme forward or rearward positions, a flanged guard-segment 11 is attached to shaft 1ª, (see Fig. 3,) said segment moving under (or over) a pin or roller 10ᶻ on the rearwardly-extending arm of lever 10ᵈ and effectively preventing depression or release of the total-key stem 10 at the wrong time.

*The printed-zero indicator.*—If the stem 10 be held down during the entire totaling operation and the machine reset to zero, the fact will be automatically indicated on the printed record by the following mechanism when the first item in a new transaction is printed. On the shaft 7ʳ beside the bail 7ᵗ is loosely mounted a type-lever 17, carrying on its upper end a single type character 17ª, preferably an asterisk or other peculiar character, which lies in position to print on the paper alined with the other type at any printing operation when said type-lever 17 is permitted to operate. This lever 17 is controlled by a spring 17ᵇ. The lower end of the lever projects below the shaft $7^r$, and on this lower end is a pin $17^d$, which normally contacts with one of the members of bail $7^j$, which rocks the lever 17 as it vibrates and ordinarily keeps the type-lever 17 from printing. Below lever 17, but adjacent its lower end, is a bell-crank catch-lever $17^f$, pivoted on a stud $17^g$ and controlled by a spring $17^h$. One arm of this lever projects toward pin $17^d$ and is adapted, if raised, to engage said pin and prevent the lever 17 returning to normal position after being moved backward by bail $7^j$. The lever $17^b$ normally lies below the path of pin $17^d$; but it is connected by a spring $17^k$ and link $17^m$ to an arm $17^n$ on shaft $10^b$, so that when the stem 10 is depressed the lever $17^f$ is lifted against pin $17^d$, placing spring $17^k$ under tension, and when bail $7^j$ is drawn forward the pin $17^d$ will move down, allowing the catch-lever $17^f$ to be drawn forward by spring $17^k$, so that if the total-key is held down during the entire oscillating movement of hand-lever $2^b$ the catch-lever $17^b$ will remain in front of pin $17^d$ in position to engage said pin and to lock lever 17 when total-key is released, (see Fig. $4^a$,) but at the next printing operation of the machine, (preceding which plate $7^g$ is swung inward to cock the type-hammers,) as above described, about the time that plate $7^g$ is tripped to release the type-hammers the lever $17^b$ is tripped, so as to release type-lever 17 and allow it to make an impression on the paper, lever $17^f$ being tripped at the proper time by means of a finger $17^z$ on bail $7^j$. (See Figs. 4 and $4^a$.) The asterisk or character printed by lever 17 will denote unmistakably on the record that a total had just previously been printed and that the numeral-disks $1^w$ had been reset to zero. If the total-key is released at end of forward movement of hand-lever, (as in taking subtotals,) the catch-lever $17^b$ will drop back to normal position and will not lock lever 17, and at the next printing operation of machine type-lever 17 will not make an impression on the paper.

*The paper-carrier.*—At the rear of the machine is a platen-roller 9 and coacting feed-rollers $9^a$ $9^b$, which are journaled in brackets $9^c$ and $9^e$, mounted on a frame $9^d$, which frame is slidably supported on a rod $9^f$, attached to the main frame. (See Fig. 3.) The platen-frame $9^d$ is provided with a rearwardly-extending finger $9^g$, which can be engaged with any one of a series of notches $9^h$ in a transverse plate $9^i$, attached to the main frame, and which will hold the carriage in any position to which it is adjusted by hand, the platen-carriage being raised or tilted by hand so as to disengage finger $9^g$ from any notch and then the carriage moved right or left until the finger is under the desired notch, when the carriage may be released and remains in such position until again shifted by hand. The platen-roller 9 is provided with the usual finger manipulating-button $9^j$ on one end, also with a ratchet $9^k$, which is engaged by a pawl $9^l$, pivotally mounted on a swinging plate $9^m$, to which is attached a longitudinally-disposed bar $9^n$, that extends the length of the roller 9. When the platen-carriage is lowered, this bar $9^n$ lies in front of an oscillating lever $9^o$, which is loosely mounted on shaft $7^e$ and vibrated by means of a link $9^z$, attached to arm $5^o$ on the shaft $5^n$. (See Fig. 2.) Lever $9^o$ oscillates bar $9^n$, so as to rotate platen 9 and turn the paper forward one line after each printing operation. The bar $9^n$ may be retracted by a spring $9^p$. By this construction a series of columns may be printed on the same sheet of paper at successive operations, the paper-carriage being shifted by hand from one notch $9^h$ to another after each column is finished.

The inking-ribbon is passed between the type and platen, as indicated in Figs. 2 and 3. Preferably I employ a two-color ribbon, and the ribbon-spools $9^r$ are slidably keyed on rotatable rods $9^s$, (see Fig. 5,) which spools are yieldingly up held by springs $9^t$. The rods have ratchets $9^u$ on their lower ends engaged by oscillating dogs $9^v$, which are shifted by any suitable means so as to enable the ribbon to be wound or unwound from one spool to the other at will. The ordinary item-printing may be done on the lower side of the ribbon, which, for example, may be blue, while the total and subtotal printing may be effected from the upper part of the ribbon, which is, for example, red. In order to shift the ribbon-spools at the proper time, curved fingers $10^g$ are attached to shaft $10^e$, and when the total-key is depressed, as above explained, said fingers $10^g$ contact with and depress the ribbon-spools $9^r$, so that the red part of the ribbon is between the type and paper, and held there while the total or subtotal is printed. When the stem 10 is released, fingers $10^g$ rise and springs $9^t$ raise the ribbon-spools so as to bring the blue ribbon into place for making the ordinary item-records.

*The repeat device.*—If the operator desires to repeat the same item a number of times, he can do so without setting the keys but once by means of the "repeating-key" 14, the stem $14^a$ of which normally lies just above the tail of the trip-pawl $4^e$ on the arm $4^b$ of key-release lever 4. When key 14 is depressed, its stem engages the tail of dog $4^e$ (see Fig. 2) and will hold said dog out of the path of pin $1^p$, so that the key-release lever 4 will not be operated, and the item may be printed a number of times in succession by holding key 14 down and oscillating hand-lever $2^b$, as above described. Stem $14^a$ may be provided with a notch $14^e$, which can be engaged with the upper guide-plate to lock the key depressed by simply pushing the key 14 to one side after it is depressed. When the key 14 is released, it is thrown upward by a spring 14$^g$ and remains out of the way, and the lever 4 then causes the release of the keys, as above described.

*Error-key.*—If at any time the operator should set up a wrong item on the keyboard and discover his error before printing it, he can correct it by depressing a key 13, whose stem 13$^a$ extends into close proximity to a rearward extension 4$^t$ of lever 4, (see Fig. 2,) and by depressing this key lever 4 is oscillated and caused to shift release-bar 4$^k$, and all the keys are released and may be reset.

Abnormal movement or casual displacement of the wheels 1 is prevented by frictional pawls 12, actuated by springs 12$^a$.

I do not limit myself to details of construction as shown, as these may be modified in many particulars without departing from the spirit of my invention.

Having thus described my invention, what I claim, and desire to secure by Letters Patent, is—

1. In a calculating-machine, the combination of a registering-wheel, an actuating-lever pivoted beside said wheel and swinging on an arc concentric therewith, a spring for moving said lever in one direction, a more powerful spring for returning said lever to normal position, a hand-lever for overcoming the more powerful spring, and means on said lever for engaging the wheel, substantially as described.

2. In combination a series of registering-wheels, a vibrating lever pivoted beside each wheel, opposite dogs carried by said levers adapted to engage the adjacent registering-wheels and means for throwing either set of dogs into operation, keys and connections for limiting the registering movements of the levers, means for returning the levers to normal position, and computing mechanism actuated by said registering-wheels, substantially as described.

3. In a calculating-machine, the combination of a series of registering-wheels on one shaft, an actuating-lever pivoted beside each wheel and swinging on an arc concentric therewith, springs for moving said levers in one direction, a more powerful spring for returning said levers to normal position, a hand-lever for overcoming the more powerful spring, and means on said levers for engaging the wheels, substantially as described.

4. In a calculating-machine, the combination of a series of registering-wheels on one shaft, an actuating-lever pivoted beside each wheel and swinging on an arc concentric therewith, a spring for moving said lever in one direction, a more powerful spring for returning said levers to normal position, a hand-lever for overcoming the more powerful spring, and means on said levers for engaging the wheels; with key-controlled devices for arresting the registering movements of said levers, and means for carrying over from one wheel to the next higher, substantially as described.

5. In combination with registering-wheels, a vibrating lever pivoted beside each wheel and swinging on an arc concentric therewith, devices on said lever adapted to engage the wheel when the lever moves in one direction, keys and connections for limiting the operative movements of said levers; springs for moving said levers in one direction, a more powerful spring-actuated device for returning the levers to normal position, and a hand-lever for overcoming the more powerful spring.

6. In combination with registering-wheels loosely mounted on a common shaft, a spring-actuated lever pivoted beside each registering-wheel and swinging on an arc concentric therewith, dogs on said levers adapted to engage the adjacent registering-wheels, a pusher on said shaft adapted to return the levers to normal position and tension their springs, a rock-shaft, gearing between the rock-shaft and the pusher-shaft, a spring for moving said rock-shaft in one direction, and a hand-lever for moving it in the opposite direction, substantially as described.

7. In combination with registering-wheels, levers beside the wheels, dogs on said levers swinging on arcs concentric with the wheels, and adapted to operate them, and means for vibrating said levers; with a series of key-stems for limiting the operative movement of each lever, catch-plates beside each row of stems adapted to hold down depressed keys until the registering mechanism has operated; means for simultaneously moving all said catch-plates to release the keys, and means, operated by the registering mechanism whereby said release is not effected until after the registering mechanism has operated, substantially as described.

8. In combination with registering-wheels, vibrating levers beside the wheels, dogs on said levers swinging on arcs concentric with the wheels, and adapted to operate them, and means for vibrating said levers; with a series of key-stems for limiting the operative movement of each lever, swinging catch-plates beside each row of stems adapted to hold down depressed keys until the registering mechanism has operated, a sliding bar for simultaneously moving all of said catch-plates to release the keys, and means, operated by the registering mechanism, whereby said release is effected after the registering mechanism has operated, substantially as described.

9. In combination, a series of rows of key-stems, a swinging catch-plate for each row of stems adapted to lock them in depressed position, a bar adjacent the ends of said catch-plates, and means on said bar adapted to engage the catch-plates and swing them away from the stems; with registering-wheels, their actuating-levers adapted to engage the stems of depressed keys, means for returning the levers to normal position, and means operated by said levers for actuating said bar so as to release the keys after the registration is effected.

10. The combination of a set of registering-wheels, their actuating-levers, a set of key-stems for limiting the operative movements of said levers, and means for resetting said levers; with catch-plates for locking the key-stems in depressed positions, a bar provided with pins adapted to engage said catch-plates and disengage them from the stems, and a vibrating lever and connections for operating said bar from and by the said actuating-levers, substantially as described.

11. In combination with a registering-wheel, an actuating-lever pivoted beside the wheel and swinging on an arc concentric therewith, the keys, and the key-stem catch-plate; of a lever-detainer attached to said catch-plate and adapted to prevent the forward movement of the lever until the catch-plate is swung to one side by the depression of a key-stem, a spring for throwing the lever in one direction when released, a more powerful spring for returning it, and means for overcoming the more powerful spring.

12. In combination, a series of registering-wheels, their actuating-levers pivoted beside the wheels and swinging on an arc concentric therewith, keys limiting the movement of each lever, and a key-stem catch-plate for each row of keys; with a lever-detainer attached to each catch-plate and adapted to prevent the forward movement of the related lever until the catch-plate is swung to one side by the depression of a key-stem, a spring for throwing each lever in one direction when released, a more powerful spring for returning it, and means for overcoming the more powerful spring.

13. In combination with adjacent registering-wheels, and means for operating said wheels; of levers hung beside said wheels and swinging on arcs concentric therewith, and dogs on said levers adapted to engage the adjacent wheels, a catch-plate adapted to lock the levers in one position, a spring for throwing each lever in one direction when released, a more powerful spring for returning it, and means for overcoming the more powerful spring, trips adapted to be operated by said wheels at every tenth tooth, so as to release the catch of the lever of higher denomination, and means for vibrating said lever whereby the carry-over is effected, substantially as described.

14. In combination with adjacent toothed registering-wheels provided with pins at every tenth tooth, and means for operating said wheels; of levers hung beside said wheels and swinging on arcs concentric therewith, dogs on said levers adapted to engage the adjacent wheel, a catch-plate adapted to lock the levers in one position, trips adapted to be operated by said wheels at every tenth tooth, so as to release the catch of the lever of higher denomination, a spring for operating the released lever, a more powerful spring for returning said lever to normal position, and means for overcoming the more powerful spring, substantially as described.

15. In combination with a set of registering-wheels having a multiple of ten teeth on their periphery, pins on each wheel adjacent every tenth tooth, a swinging lever beside each wheel and swinging on arcs concentric therewith, a pawl thereon in normal engagement with the wheels, a spring-actuated catch-plate for locking said levers in inoperative position, a trip on each lever adapted to be operated by the pin on the wheel, and to release the catch of the adjacent lever of higher denomination, a spring for operating the released lever, a more powerful spring for returning said lever to normal position, and means for overcoming the more powerful spring, substantially as described.

16. In a calculating-machine, the combination of registering mechanism; with means for indicating the last "item" registered, and means for throwing the "item-registering" mechanism into mesh with the registering mechanism during the registering of an item, and for disengaging it from said registering mechanism and resetting it to zero before the registering of the next item.

17. In a calculating-machine, the combination with the registering-wheels; of numeral-disks adapted to indicate the last "item" registered, and means for throwing the disks into mesh with the registering-wheels during the registering of an item, and for disengaging them from said registering-wheels and resetting them to zero before the registering of the next item.

18. In combination with registering-wheels, and mechanism for operating them; of item-indicating disks provided with pinions and mounted on a movable support, means for normally holding said numeral-disks at "0" position when out of mesh with the registering-wheels; means for moving said disks into mesh with the registering-wheels before the latter are operated to register an item; means for holding said disks in mesh with the wheels after they have operated, so that the item registered can be read therefrom, and means for returning the disks to zero, before the next operative movement of the registering-wheels, substantially as and for the purpose described.

19. In combination with movable type-carriers of different denominations and type-hammers adapted to actuate the type at the printing-point; of a movable slide adjacent the hammers adapted to contact with the displaced type-carrier of highest denomination and arrest the slide in position to lock the hammers of type-carriers of higher denomination, means for automatically throwing said slide into operative position after the type-carriers have reached their printing positions, but before the printing operation, and means for returning the slide to inoperative position after the printing operation, substantially as described.

20. The combination of registering-wheels, type-carriers of different denominations controlled by said wheels, type-hammers adapted to engage the type at the printing-point, and means for cocking said hammers; with a device for locking the hammers of all carriers of higher denomination whose registering-wheels are not actuated; means controlled by the hammer-cocking devices for releasing said locking device before the hammers are released; means for withdrawing the locking device out of the way after the printing operation, and means for holding the locking device in retracted position until the hammers are ready for the next printing operation, substantially as described.

21. In combination, the registering-wheels, their actuating-levers, longitudinally-movable type-carriers of different denominations attached to said levers, and oscillating type-hammers adapted to actuate the type at the printing-point; with a sliding locking-plate adjacent the hammers, a finger on said plate adapted to contact with the displaced type-carriers of highest denomination, and arrest the slide in position to lock the hammers of any undisplaced type-carriers of higher denomination, a spring for automatically throwing said slide into operative position after the type-carriers have reached their printing positions, but before the printing operation, and means for returning the slide to inoperative position after the printing operation, substantially as described.

22. In combination, the registering-wheels, their vibrating actuating-levers, the curved type-carriers of different denominations attached to said levers, oscillating type-hammers adapted to engage the type at the printing-point, and means for cocking said hammers; with a slide for locking the hammers of all carriers of higher denomination whose registering-wheels are not actuated; means controlled by the hammer-cocking devices for releasing said locking-plate before the hammers are released; means for withdrawing the slide out of the way after the printing operation, and means for locking the slide in retracted position until the hammers are cocked for the next printing operation, substantially as described.

23. In a calculating-machine, the combination of a registering-wheel, a key-controlled lever, a pair of dogs mounted on said lever, means for normally holding one dog in engagement with the registering-wheel, and means for throwing said dog out of engagement when the other dog is thrown into engagement, substantially as described.

24. In a calculating-machine, the combination of a plurality of registering-wheels, a key-controlled lever for each wheel, a pair of dogs mounted on each lever, means for normally holding one dog in engagement with the adjacent registering-wheel, and means for throwing said dog out of engagement when the other dog is thrown into engagement, and a computing train of disks actuated by said wheels, substantially as described.

25. In combination, a series of registering-wheels loosely mounted on a common shaft, a vibrating lever beside each wheel, opposite dogs carried by said levers adapted to be engaged with the adjacent registering-wheel, means for holding one set of the dogs normally out of operation, keys and connections for limiting the registering movements of the levers, and means for returning the levers to normal position, substantially as described.

26. In combination with a set of registering-wheels having a multiple of ten teeth on their periphery, pins on each wheel adjacent every tenth tooth, a swinging lever beside each wheel, a pawl thereon in engagement with the wheels, a spring-actuated catch-plate for locking said levers in inoperative position, a trip on each lever, adapted to be operated by the pin on the wheel, and to release the catch of the adjacent lever of higher denomination, a spring for retracting the lever when released; means for returning said lever to normal position, whereby the carry-over is effected, and means for throwing the dogs out of operative position when it is desired to take the total.

27. In combination with the registering-wheels, and vibrating levers for actuating said wheels pivoted beside the wheels and swinging on arcs concentric therewith; of a total-key and connections whereby when the total-key is depressed the levers are permitted to turn the wheels until brought to "zero" position, substantially as described.

28. In combination, registering-wheels, vibrating levers for actuating said wheels pivoted beside the wheels and swinging on arcs concentric therewith; and a total-key and connections whereby when the total-key is depressed the levers are permitted to turn the wheels until brought to "zero" position; with type-carriers attached to said levers, and mechanism for taking an impression from the type to print the total before the total-key is released, substantially as described.

29. In combination with registering-wheels, vibrating levers for actuating said wheels, pawls carried by said levers adapted to operate the wheels in either direction, type-carriers controlled by said levers, and mechanism for taking an impression from the type after the registering-wheels have come to rest; of a total-key and connections for disengaging one set of dogs from the wheel and throwing the other dogs into engagement therewith, mechanism for simultaneously releasing the levers, and means whereby the printing mechanism is operated to print the total while the said total-key is depressed.

30. In combination, registering-wheels, vibrating levers for actuating said wheels, pawls carried by said levers adapted to operate the wheels in one direction, other pawls carried by said levers adapted to engage the wheels and move them in the reverse direction, type-carriers connected to and actuated by said levers, and mechanism for taking an impression from the type after the levers have made their inward stroke; with a total-key and connections for disengaging the first dogs from the pawls and throwing the reverse dogs into engagement therewith, mechanism for simultaneously releasing the levers, and means whereby the printing mechanism is operated to print the total while the said total-key is depressed.

31. In combination, registering-wheels, vibrating levers for actuating said wheels pivoted beside the wheels and swinging on arcs concentric therewith, springs for throwing the levers in one direction, a more powerful spring for returning the levers to normal position, and a hand-lever for overcoming the more powerful spring; with a total-key and connections whereby when the total-key is depressed the levers are permitted to turn the wheels in the reverse direction until brought to "zero" position, substantially as described.

32. In combination, registering-wheels, vibrating levers for actuating said wheels pivoted beside the wheels and swinging on arcs concentric therewith, springs for throwing the levers in one direction, a more powerful spring for returning the levers to normal position, and a hand-lever for overcoming the more powerful spring; with a total-key and connections whereby when the total-key is depressed the levers are permitted to turn the wheels in the reverse direction until brought to "zero" position; type-carriers attached to said levers, and mechanism for taking an impression from the type to print the total before the total-key is released, substantially as described.

33. In combination, registering-wheels, vibrating levers for actuating said wheels pivoted beside the wheels and swinging on arcs concentric therewith, movable type-carriers controlled by said wheels, and a printing mechanism for taking an impression from the type on said carriers when the wheels come to rest; with a total-key and connections whereby when said key is depressed, the registering-wheels are permitted to move back to "zero" position, and the total is printed, substantially as described.

34. In combination, registering-wheels, vibrating levers actuating said wheels, an item-indicator normally meshed with said wheels, movable type-carriers controlled by said wheels, and a printing mechanism for taking an impression from the type on said carriers when the wheels come to rest; with a total-key and connections whereby when said key is depressed the item-indicator is thrown out of mesh with the registering-wheels, the latter are permitted to move back to "zero" position, and the total is printed, substantially as described.

35. In combination with registering-wheels, vibrating levers for operating said wheels pivoted beside the wheels and swinging on arcs concentric therewith, type-carriers attached to said levers, mechanism for taking impressions from type on said carrier at each operation of the registering mechanism, and a total-key and connections whereby upon the depression of said key the total may be printed and the registering mechanism reset to "zero" at the will of the operator.

36. In combination, registering mechanism, type-carriers controlled thereby, and mechanism for taking an impression from the type; with a total-key and connections whereby when said key is depressed the total may be printed on the record in a distinctive color, and mechanism whereby at the next following printing operation a significant character indicating that the machine had been cleared, will be printed on the record simultaneously with the item recorded, substantially as described.

37. In combination, registering-wheels, vibrating levers for operating said wheels, type-carriers attached to said levers, mechanism for taking impressions from type on said carrier at each operation of the registering mechanism, and a total-key and connections whereby upon the depression of said key the total may be printed; with mechanism whereby at the next succeeding printing operation a significant character, indicating that the machine had been cleared, will be printed on the record simultaneously with the item recorded, substantially as described.

38. In combination, registering-wheels, vibrating levers for actuating said wheels pivoted beside the wheels and swinging on arcs concentric therewith, movable type-carriers controlled by said wheels, and a printing mechanism for taking an impression from the type on said carriers when the wheels come to rest; with a total-key and connections whereby when said key is depressed, the registering-wheels are permitted to move back to "zero" position, and the total is printed, and mechanism whereby at the next printing operation of the machine a significant character will be printed on the record indicating that the machine had been previously "cleared."

39. The combination of registering-wheels, their actuating-levers pivoted beside the wheels and swinging on arcs concentric therewith, type-carriers attached to said levers, and key-controlled means for varying the throw of said levers; type-hammers adapted to engage the type at the printing-point, a spring for actuating each hammer, means for cocking the hammers prior to the printing operation, and means for tripping said hammers at the proper time; with a "total-indicator" printing-lever beside the type-hammers, mechanism whereby said lever is cocked by the hammer-cocking means, means for normally keeping the total-indicator from effective operation, and a total-key and connections whereby said total-indicator is permitted to become active, substantially as set forth.

40. The combination of registering-wheels, a vibrating lever beside each wheel, dogs on said levers swinging on arcs concentric with the wheels and adapted to move the wheels in one direction; a series of numbered key-stems for limiting the movement of each lever, a swinging catch-plate beside each row of stems adapted to engage and retain any depressed key-stem until another stem is depressed, means whereby after the registering mechanism has been operated, all said catch-plates are simultaneously disengaged from the stems, and means for returning the levers to normal position.

41. In a calculating-machine, the combination with the registering-wheels; of means adapted to indicate the last "item" registered, comprising a set of numeral-disks, means for turning said disks by and from the registering-wheels on recording an item, and means for resetting the said disks to "zero" before the registering of the next succeeding item, substantially as described.

42. The combination of registering-wheels, vibrating levers for actuating said wheels, type-carriers attached to the upper ends of said levers, and key-controlled means for limiting the throw of said levers; with vibrating type-hammers $7^s$ adapted to engage the type opposite the printing-point, a spring for actuating each hammer, a pivoted push-plate $7^g$ for cocking the hammers, means for tripping said push-plate to release the hammers at the proper time, and a slide 8 for locking the hammers of the levers of higher denomination which have not been released by key action, substantially as described.

43. The combination of the registering-wheels, vibrating levers and connections for operating said wheels, key-controlled mechanism for variously limiting the recording movements of the levers, type-carriers attached to said levers, a platen, a series of vibrating type-hammers, springs for operating said hammers to make an impression; a push-plate $7^g$ for cocking the hammers preparatory to the printing operation, and means for tripping said hammers at the proper moment; a spring-actuated slide 8 for locking the hammers of levers of higher denomination unless the said levers have been released, and means for returning the slide and hammers to normal position after each operation, substantially as described.

44. The combination of the registering-wheels, vibrating levers and connections for operating said wheels, and key-controlled mechanism for variously limiting the recording movements of the levers; with curved type-carriers attached to said levers, a series of separately-movable type mounted on each carrier, a platen, a series of vibrating type-hammers $7^s$, springs for operating said hammers to make an impression; an oscillating pusher-plate $7^g$, means for causing said plate to cock the hammers preparatory to the printing operation, means for tripping said plate so as to release the hammers at the proper moment; and means for returning the push-plate and hammers to normal position after each operation, substantially as described.

45. The combination of registering-wheels, actuating-levers pivoted beside the wheels, type-carriers 7 attached to said levers, and key-controlled means for varying the throw of said levers; type-hammers $7^d$ adapted to engage the type at the printing-point, a spring for actuating each hammer, a plate $7^g$ for cocking the hammers prior to the printing operation, and means for tripping said hammers at the proper time; with a "total-indicator" printing-lever beside the type-hammers, mechanism whereby said lever is cocked by the hammer-cocking means; means for normally keeping the total-indicator from effective operation, and a total-key and connections whereby said total-indicator is permitted to become active, substantially as set forth.

In testimony that I claim the foregoing as my own I affix my signature in presence of two witnesses.

GEORGE E. SCHUMAN.

In presence of—
O. A. METZNER,
FRANK R. MERHOFF.